United States Patent
Ober et al.

(10) Patent No.: US 7,062,606 B2
(45) Date of Patent: Jun. 13, 2006

(54) MULTI-THREADED EMBEDDED PROCESSOR USING DETERMINISTIC INSTRUCTION MEMORY TO GUARANTEE EXECUTION OF PRE-SELECTED THREADS DURING BLOCKING EVENTS

(75) Inventors: Robert E. Ober, San Jose, CA (US); Roger D. Arnold, Sunnyvale, CA (US); Daniel Martin, Mountain View, CA (US); Erik K. Norden, Unterhaching (DE)

(73) Assignee: Infineon Technologies AG, Munich (DE)

( * ) Notice: Subject to any disclaimer, the term of this patent is extended or adjusted under 35 U.S.C. 154(b) by 392 days.

(21) Appl. No.: 10/431,996

(22) Filed: May 7, 2003

(65) Prior Publication Data

US 2004/0088488 A1     May 6, 2004

Related U.S. Application Data

(60) Provisional application No. 60/423,282, filed on Nov. 1, 2002.

(51) Int. Cl.
*G06F 12/00* (2006.01)
(52) U.S. Cl. ...................................... 711/121
(58) Field of Classification Search ............... 711/118, 711/121; 712/228, 229
See application file for complete search history.

(56) References Cited

U.S. PATENT DOCUMENTS

| | | | |
|---|---|---|---|
| 6,779,065 B1 * | 8/2004 | Murty et al. | 710/260 |
| 2002/0018486 A1 * | 2/2002 | Musoll et al. | 370/463 |
| 2003/0067913 A1 * | 4/2003 | Georgiou et al. | 370/389 |

* cited by examiner

*Primary Examiner*—Kevin L. Ellis
(74) *Attorney, Agent, or Firm*—Dickstein, Shapiro, Morin, & Oshinsky, LLP.

(57) ABSTRACT

A multi-threaded embedded processor that includes an on-chip deterministic (e.g., scratch or locked cache) memory that persistently stores all instructions associated with one or more pre-selected high-use threads. The processor executes general (non-selected) threads by reading instructions from an inexpensive external memory, e.g., by way of an on-chip standard cache memory, or using other potentially slow, non-deterministic operation such as direct execution from that external memory that can cause the processor to stall while waiting for instructions to arrive. When a cache miss or other blocking event occurs during execution of a general thread, the processor switches to the pre-selected thread, whose execution with zero or minimal delay is guaranteed by the deterministic memory, thereby utilizing otherwise wasted processor cycles until the blocking event is complete.

29 Claims, 3 Drawing Sheets

MULTI-THREADED EMBEDDED PROCESSOR USING DETERMINISTIC INSTRUCTION MEMORY TO GUARANTEE EXECUTION OF PRE-SELECTED THREADS DURING BLOCKING EVENTS

CLAIM OF PRIORITY

This application claims priority to U.S. provisional application Ser. No. 60/423,282, filed Nov. 1, 2002 entitled "MULTITHREADING TO OVERCOME EFFICIENCY LOSS CAUSED BY SLOW EXTERNAL PROGRAM MEMORY IN EMBEDDED PROCESSORS".

FIELD OF THE INVENTION

This invention relates to electronic systems that utilize embedded processors and inexpensive external memory devices, and more particularly to the embedded processors utilized in such systems.

BACKGROUND OF THE INVENTION

FIG. 1(A) is a partial perspective view showing a system 100 including an embedded processor (or embedded controller) 110 and an external memory device 120 mounted on a suitable substrate 101 (e.g., a printed circuit board). Note that embedded processor 110 and external memory device 120 are discrete components (i.e., separately fabricated and packaged) such that communication between the devices is transmitted over external connections (e.g., copper traces 115 formed on substrate 101). System 100 may also include one or more additional devices 130 (e.g., sensor or actuator circuits) that are connected to embedded processor 110 by corresponding connections provided on substrate 101. Embedded processor device 110 and external memory device 120 cooperate to perform a specific control function (i.e., as opposed to general purpose computing) within system 100. For example, embedded processor 110 may generate control signals in response to a program stored on external memory device 120 that control one or more components of system 100 (e.g., functions executed by devices 130).

FIG. 1(B) is a partial perspective view showing an alternative system 100A including an embedded processor 110A and an external memory device 120A. As in the previous example, embedded processor 110A and memory device 120A are discrete components. However, system 101A utilizes a "die-to-die" hybrid package arrangement in which memory device 120A is mounted directly onto processor 110A using known techniques. Note that this alternative arrangement also requires external connections between processor 110A and memory device 120A (e.g., via solder bump/contact pad connections), and otherwise operate essentially the same as system 100. Therefore, in the following discussion, references to system 100 are understood to address similar structures of system 10A.

FIG. 2 is a block diagram showing a portion of system 100 in additional detail. Embedded processor 110 includes a processor core 210, a program counter 220, an instruction cache 230, and several additional circuit structures (omitted for brevity) that are integrated in a System-On-Chip (SoC) arrangement. Processor core 210 executes a program that is at least partially stored on memory device 120. This program includes a sequence of instructions representing an algorithm that defines the specific control function performed by system 100. Program counter 220 stores an instruction address value that is used to call or "fetch" the next instruction in the program's instruction sequence for loading into processor core 210. Instruction cache 230 is used to temporarily store previously used instructions in order to facilitate faster processing. That is, the first time an instruction is called (i.e., its address appears in program counter 220), the instruction must be read from external memory device 120 and then loaded into processor core 210, which requires a relatively long time to perform. During this initial loading process, the instruction is also stored in a selected memory location of cache 220. When the same instruction is subsequently called (i.e., its address appears a second time in program counter 220), the instruction is read from cache 230 in a relatively short amount of time (i.e., assuming its associated memory location has not been overwritten by another instruction). Note that the number of instructions stored in cache 220 is determined by the size (i.e., number of memory locations) of cache 220, and therefore the size of cache 220 typically determines the likelihood that a particular instruction will be quickly read from cache 220 (as opposed to the relatively long process of reading the instruction from external memory device 120).

Like all other present day processor devices, embedded processors have benefited from advances in semiconductor fabrication technology to provide increasingly greater performance and operating frequency (MHz). However, for cost reasons, many electronic systems incorporating embedded processors are forced to use inexpensive, relatively slow external memory devices to store associated program instructions (usually FLASH type memory devices, and usually several MByte). At one point the operating frequencies of embedded processors and inexpensive external memory devices were well matched. However, more recently, the operation frequencies of embedded processor cores have increased significantly (e.g., to approximately 400 MHz), while the operating (read/write) frequencies of inexpensive external memories have remained relatively slow (e.g., approximately 40 MHz). That is, referring to FIG. 2, each time an instruction is not stored in cache 230 (referred to herein as a "cache miss") and must be read from external memory device 120 (a "miss fetch"), processor core 210 must stop and wait until the miss fetch process is completed (a "fetch return"). When the operating frequency of the embedded processor core is substantially faster than that of the external memory, the penalty time (i.e., the unused processing cycles) associated with each cache miss significantly reduces the effective operating speed of the embedded processor. For example, assuming a processor core executes one instruction per clock cycle (a.k.a. "clock") and a cache miss penalty time of 100 clocks, then even if the cache miss rate is 1% (i.e., one cache miss per 100 instructions), then 200 clocks are required to complete 100 instructions, which reduces the effective processor efficiency to 50%. Further, in reality, a 1% cache miss rate is well above average, and realistic cache miss rates are typically much higher, thereby further reducing effective processor efficiency. Consequently, even when an embedded processor includes a relatively large and fast instruction cache, the effective performance of a 400 MHz processor core is about the same as a 40 MHz core because the cache miss penalty time is so large.

Conventional approaches to solve the cache miss penalty problem described above typically involve increasing the size of the instruction cache, or use memory overlays or large amounts of memory on the embedded processor chip. However, increasing the size of the cache memory increases the embedded processor cost, and only partly solves the cache miss penalty problem. That is, a larger cache increases the overall size of the embedded processor, thereby reducing production yield (e.g., chips per wafer) and thus increasing the cost per embedded processor. Further, as set forth in the example above, cache misses will periodically occur no matter how large the cache, with each cache miss costing a significant cache miss penalty (on the order of 100 clocks), so the performance of the embedded processor remains far below the maximum operating frequency of the embedded processor. Therefore, the only sure way to completely avoid the cache miss penalty is to store all program instructions on-chip (i.e., eliminate the external memory device completely). However, this further increases the chip size (and hence the chip cost, and significantly increases operating power. In the highly competitive industries that utilize low cost embedded processors, such high cost, high power alternatives are rarely considered acceptable.

Hence there is a need for an embedded processor and associated method that address the cache miss penalty problem (defined above) without significantly increasing the cost and power consumption of the embedded processor.

SUMMARY

The present invention is directed to an embedded processor that combines architectural characteristics of "Block Multi-Threading" (BMT) (and some aspects of differential BMT) with a relatively small, low latency "deterministic" (e.g., scratch or locked cache) memory that stores all instructions associated with a pre-selected thread, thereby guaranteeing execution of the pre-selected thread when a blocking event occurs during execution of a general (e.g., boot or master) thread. By executing the pre-selected thread during the otherwise unused processor cycles associated with the general thread blocking event, the multi-threaded embedded processor exhibits significantly improved processor efficiency without significantly increasing the cost and power consumption of the resulting embedded processor.

In accordance with an embodiment of the present invention, a multi-threaded embedded processor includes a processor core, a low latency scratch memory, and a conventional cache memory that is coupled through I/O circuitry to an external memory device. Unlike the cache memory, which temporarily stores instructions using virtual addressing schemes, the scratch memory continuously stores instructions such that the instructions are physically addressed, are not subject to overwriting during system operation, and are physically located adjacent to the processor core, whereby each instruction call associated with the execution of the pre-selected thread is perfectly deterministic (i.e., predictable). The processor core includes a multi-threaded architecture for selectively loading and executing instructions associated with either a general (first) thread or a pre-selected (second) thread. Separate program counters are provided for fetching instructions associated with the general and pre-selected threads, with a first program counter being coupled to the cache memory and/or external memory for fetching instructions associated with the general thread, and a second program counter being coupled to the scratch memory for fetching instructions associated with the pre-selected thread. A suitable multiplexing arrangement cooperates to load instructions from the cache memory to the processor core during execution of the general thread, and to load instructions from the scratch memory to the processor core during execution of the pre-selected thread.

According to another embodiment of the present invention, a method for operating the multi-threaded embedded processor begins by identifying a pre-selected thread, and storing all instructions associated with the pre-selected thread in the low latency scratch memory such that the instructions are physically addressable (as opposed to the virtual addressing scheme utilized in standard cache memories). The pre-selected thread is selected, for example, after an associated source program is compiled, and is ideally a timing critical thread, or a thread that contains repetitive short code loops. Once stored in the scratch memory, the instructions associated with the pre-selected thread are continuously maintained (i.e., not subject to overwriting). A general (first) thread is then executed using conventional techniques (i.e., instructions are called from the instruction cache memory and/or from the external memory device). When the general thread becomes blocked (e.g., due to a cache miss), the processor core switches execution the pre-selected thread whose non-blocking operation is guaranteed due to the presence of all instructions in the scratch memory, thereby minimizing the number of unused processor clock cycles that are otherwise lost until the block is cleared (e.g., the missing instruction is fetched). When the blocking event associated with the general thread is completed, the processor core switches execution back to the general thread. By selecting a pre-selected thread that both contains a limited number of instructions and is frequently utilized by the processor core, the present invention provides an inexpensive embedded processor system that exhibits substantially improved performance over conventional embedded processor systems without significantly increasing production costs and power consumption. That is, the processor cycles that would otherwise be wasted between the fetch miss and fetch return can be fully utilized by execution of the pre-selected thread. Depending on the amount of work performed by the pre-selected second thread, the cache miss rate, and the cache miss penalty time, embedded processors incorporating the present invention exhibit a performance gain in the range of 25% to 1000%.

The present invention will be more fully understood in view of the following description and drawings.

DETAILED DESCRIPTION

Figure 1A:
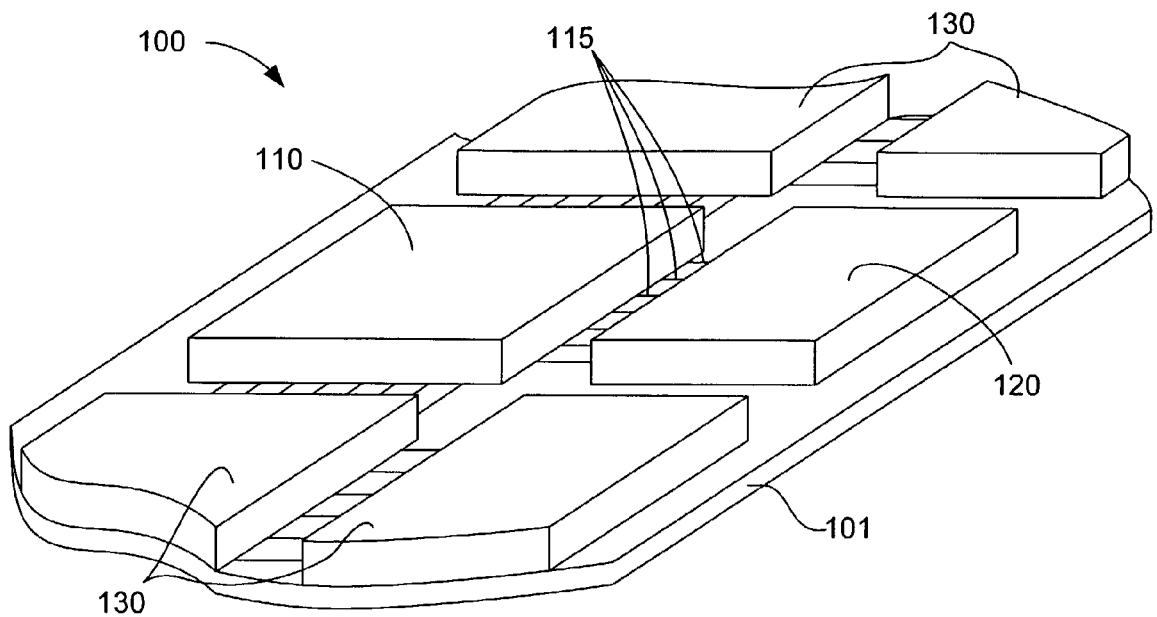
FIGS. 1(A) and 1(B) are perspective views showing conventional systems incorporating embedded processors.

The term "embedded processor" is utilized herein to mean a discretely packaged semiconductor device including a processor core (e.g., a central processing unit (CPU)) whose purpose is to perform a specific function (i.e., as opposed to general purpose computing) within an electronic system.

Instruction and data words associated with the specific function performed by the embedded processor are at least partially stored on an inexpensive external memory device (e.g., an EEPROM or flash memory device) that is accessed by the embedded processor during operation. In addition to the CPU, the embedded processor may also include other circuits associated with performance of the specific (e.g., control) function performed within the electronic system, such as on-chip data memory, serial and/or parallel input/output (I/O) circuitry, timers, and interrupt controllers. Moreover, the embedded processor may be a system-on-chip (SoC) type device that includes one or more of a digital signal processor (DSP), an application specific integrated circuit (ASIC), and field programmable logic circuitry. Those of ordinary skill in the art will recognize that, as used herein, the term "embedded processor" is synonymous with the term "embedded controller", is also synonymous with some devices referred to as "microcontrollers".

The concept of multi-threading is well known in the processor arts, and generally refers to processor architectures (herein referred to as "multi-threaded" processors) that simultaneously hold the state of two or more active threads, and switch execution in the processor core between first and second active threads by loading the execution state and executing instructions associated with the first thread, and then loading the execution state and executing instructions associated with the second thread. The term "thread" is also well known in the processor arts, and generally refers to a set of related instructions (e.g., a sequence of instructions) that are grouped during the compiling of a source program. In both multi-threaded and non-multi-threaded processors, threads are dynamically scheduled for execution by a processor during system operation, while the instructions within each active thread are statically scheduled for execution by the compiler prior to system operation. However, unlike non-multi-threaded processors that include only one active thread at a given time and must complete one thread before beginning another, multi-threaded processors are able to switch from a partially executed first thread to a partially executed second thread.

The present invention is particularly directed to multi-threaded processors that perform block multi-threading (BMT, a.k.a. non-strict) execution, as opposed to non-blocking (strict) execution. In the non-blocking thread model, a thread cannot begin execution until all of its operands have arrived (i.e., are stored in a pre-decode stage of the processor), and once execution of the thread begins, the thread runs to completion without suspension. In the BMT model, a thread may begin executing before all of its operands are locally available (e.g., stored in cache memory). When, for example, a cache miss occurs and an instruction must be read from a relatively slow external memory device, the current (first) thread will suspend (block) and its execution will be resumed when the blocking event (e.g., the fetch return) is completed. The processor will store all of the necessary state information associated with the first thread, and load another (second) active thread for execution. The BMT model provides a more lenient approach to thread generation (often resulting in the tolerance of larger threads) at the expense of requiring additional hardware mechanisms for the storage of blocked threads. Examples of processors that perform block multi-threading include products in the TriCore™ Unified Processor family produced by Infineon Technologies AG, and Hyperthreading Pentium™ 4 processors produced by Intel Corporation. However, while the present invention is described below with reference to embedded processors that perform block-ing-type multi-threaded execution, the present invention may also be incorporated into embedded processors that perform non-blocking multi-thread operations.

In theory, multi-threaded processors should address the cache miss penalty problem (discussed above) by delivering much closer to 100% processor efficiency while reducing the amount of required on-chip memory. However, to the knowledge of the inventors, no prior art processors have utilized multi-threading to address the cache miss penalty problem (i.e., to compensate for external memory that is an order of magnitude slower than the processor). Instead, multi-threading is typically used when "n" copies of the same code base must be used on "n" data sets (for orthogonal frequency digital multiplexing (OFDM)), when an approach is used to avoid pipeline blockages in the processor, to efficiently use the resources of a multi-issue processor, or to simplify very high-performance pipelines (note that these applications are typically utilized in high-end $300 to $1M processors). In these instances, all threads are executed from cache, and even with a low miss rate (which would go down because of the cache thrash of multiple threads resident in one cache), the overall improvement provided by multi-threading is approximately 30% to 40%. The inventors note that this problem is typically addressed by one versed in the processor arts by adding a larger cache, or a more efficient cache, or to place the complete memory on-chip, which raises the high cost and power consumption issues described above.

The present invention addresses the conventional cache miss penalty problem (defined above) by combining a multi-threaded processor core with a deterministic memory circuit that continuously stores all instructions associated with a pre-selected thread. The term "deterministic memory" is utilized herein to refer to a memory circuit provided on the multi-threaded embedded processor in which instructions are stored such that the time required to load (call) any instruction from the deterministic memory to the processor core is known (i.e., fixed or predictable). That is, unlike the relatively unpredictable performance associated with calls from cache/external memory, all instructions called from the deterministic memory have essentially identical load times. In one embodiment, deterministic memory includes so-called "scratch" memory, wherein addresses are physically addressed (as opposed to the virtual addressing associated with conventional cache memory), and physically stored adjacent to the processor core. Ideally, such a deterministic/scratch memory exhibits zero latency (or zero wait states). In another embodiment, the deterministic memory has a latency of one or more clocks (or "n" wait states), can be located on a remote bus on the SoC, or can be a multi-cycle memory circuit. In yet another embodiment discussed below, deterministic memory includes a "locked cache" memory in which each instruction is loaded as in "normal" cache, but is subsequently "locked" (i.e., not overwritten by another instruction).

As set forth in the exemplary embodiments described below, by combining a multi-threaded architecture with a locally-attached, low latency deterministic memory, and by continuously storing all instructions associated with a pre-selected thread in the deterministic memory such that non-blocked execution of the pre-selected thread is guaranteed, the present inventors found that the efficiency of an embedded processor can be increased by 25 to 1000%.

Figure 1B:
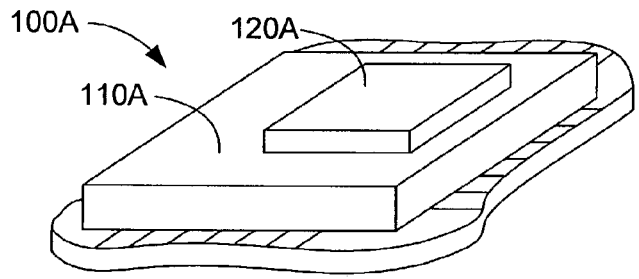
Figure 2:
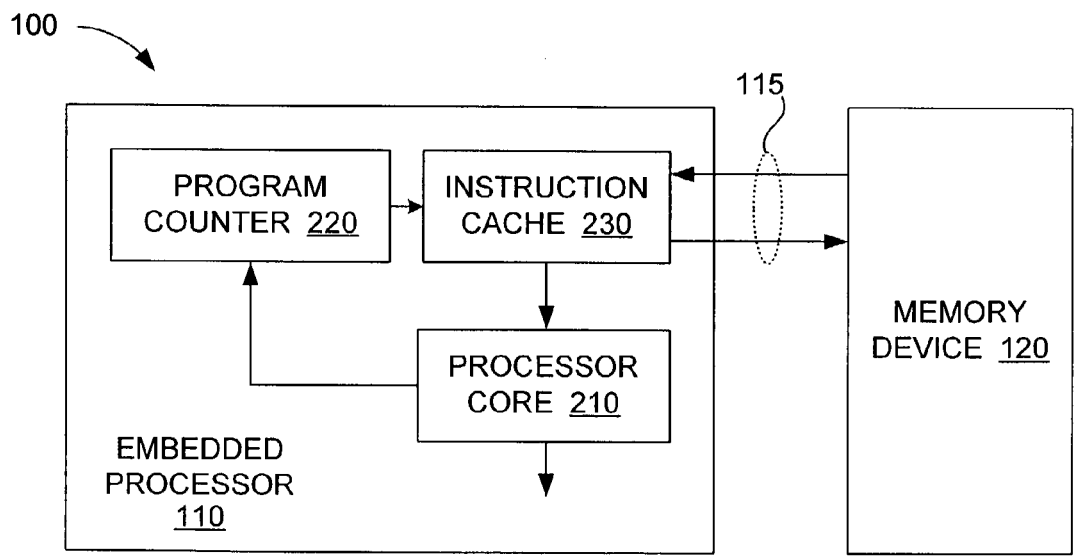
FIG. 2 is a simplified block diagram showing the conventional embedded processor system of FIG. 1(A) in additional detail.
Figure 3:
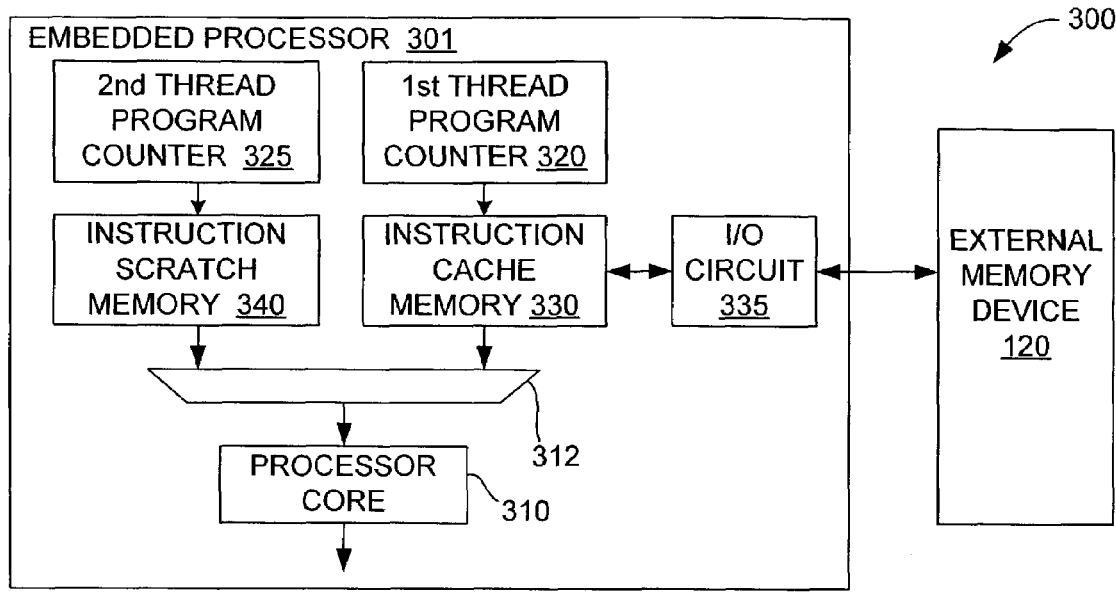
FIG. 3 is a simplified block diagram showing an embedded processor system according to a specific embodiment of the present invention.

FIG. 3 is a block diagram showing a portion of a system 300 including a multi-threaded embedded processor 301 according to a simplified embodiment of the present invention. System 300 also includes conventional external memory device 120, which is introduced above. Accordingly, system 300 includes separately fabricated embedded processor 301, external memory device 120, and zero or more additional electronic device arranged, for example in the manner similar to that shown in FIGS. 1(A) and 1(B).

Referring to the left side of FIG. 3, embedded processor 301 includes a processor core 310, a first program counter 320, a second program counter 325, an instruction cache memory 330, an input/output (I/O) circuit 335, an instruction scratch memory 340, and a multiplexer (switching circuit) 312. Note that in one embodiment multiplexer 312 is connected between the respective memories and program counters instead of between the memories and processor core 310. Although omitted for brevity, embedded processor also includes one or more additional circuit structures that are integrated in a System-On-Chip (SoC) arrangement. For example, a system memory interface (not shown) is typically utilized to interface between the respective memories and program counters.

According to an aspect of the present invention, processor core 310 includes a multi-threaded architecture capable of simultaneously holding (storing) the state of two or more threads, and dynamically scheduling execution of the two threads during system operation according to known techniques. The two threads executed by processor core 310 in the present example are referred to as a general (first) thread and a pre-selected (second) thread for reasons that will become clear below. As understood in the processor arts, simultaneously holding the execution state of two threads requires the ability to store two complete instantiations of processor architectural state at one time (this should not be confused with storing two complete states of the pipeline, which is characteristic of differential Multi-Threading (dMT) type processors, although the present invention may also be utilized in these processors as well). Either instantiation can constitute the active virtual processor (or task thread), although only one is considered the "master" or boot time thread (in the example below, the general thread is treated as the boot time thread, but this boot time thread selection is not necessarily required). Processor core 310 also includes two complete sets of processor context or pointers to the two complete, independent sets of processor context. With this architecture, processor core 310 can easily switch between execution of the general thread and the pre-selected thread according to known multi-threading techniques. Further, in addition to the thread-switching function described below, processor core 310 may include one or more additional circuits for dynamically scheduling execution of the general and pre-selected threads, such as a timer device (not shown) that controls the maximum number of clocks allowed for each thread to execute uninterrupted.

Multiplexer 312 represents a switching circuit that facilitates the loading of instructions into processor 310 from either cache memory 330 or scratch memory 340. In particular, multiplexer 312 includes a first set of input terminals connected to receive instructions read from cache memory 330, a second set of input terminals connected to receive instructions read from scratch memory 340, and a set of output terminal connected to an appropriate decode circuit associated with the processor core. During execution of the general thread, processor 312 generates a suitable control signal that causes multiplexer 312 to pass instruction signals associated with the general thread from cache memory 330. Conversely, during execution of the pre-selected thread, processor 312 generates a suitable control signal that causes multiplexer 312 to pass instruction signals associated with the pre-selected thread from scratch memory 340. Those skilled in the processor art will recognize that multiplexer 312 may be replaced with a number of alternative circuit arrangements.

Similar to conventional program counter circuits, program counters 320 and 325 store instruction address values that are used to call (fetch) a next instruction during the execution of a thread. In particular, program counter 320 stores an instruction address value associated with the execution of the general thread, and transmits this instruction address value to cache memory 330. Conversely, program counter 325 stores an instruction address value associated with the execution of the pre-selected thread, and transmits this instruction address value to scratch memory 340. Those familiar with the operation of program counters will recognize that the respective instruction address values stored therein are controlled in part by the operation of processor core 310, and that a single program counter circuit may be utilized in place of separate program counters 320 and 325.

Also similar to conventional processors, cache memory 330 is used to temporarily store instructions associated with the general thread that are read from external memory device 120. That is, the first time an instruction of the general thread is called (i.e., its address appears in program counter 320), the instruction must be read from external memory device 120 via I/O circuit 335 and then loaded into processor core 310 (by way of multiplexer circuit 312), which requires a relatively long time to perform. During this initial loading process, the instruction is also stored in a selected memory location of cache 320. When the same instruction is subsequently called (i.e., its address appears a second time in program counter 320), the instruction is read from cache 330 in a relatively short amount of time (i.e., assuming its associated memory location has not been overwritten by another instruction).

According to a second aspect of the present invention, scratch (deterministic) memory 340 is a low latency memory that continuously stores all instructions associated with the pre-selected thread, thereby guaranteeing execution of the pre-selected thread when a blocking event occurs during execution of the general thread. The phrase "continuously stored" is used to indicate that, unlike instructions written to cache memory 330, instructions stored in scratch memory 340 are not subject to overwriting during system operation. In one embodiment, scratch memory 340 is a "write once, read many" type memory circuit in which instructions associated with the pre-selected thread are written during an initial "configuration" system operating phase (i.e., prior to thread execution). In another embodiment, scratch memory 340 may be a mask programmable Read-only-Memory (ROM) circuit, although this optional embodiment would preclude system updates. In either case, scratch memory 340 is characterized by storing the instructions associated with the pre-selected thread such that the instructions are physically addressed by program counter 325, and are physically located adjacent to processor core 310, whereby each instruction call associated with the execution of the pre-selected thread is perfectly deterministic (i.e., predictable) and is relatively low latency.

Figure 4:
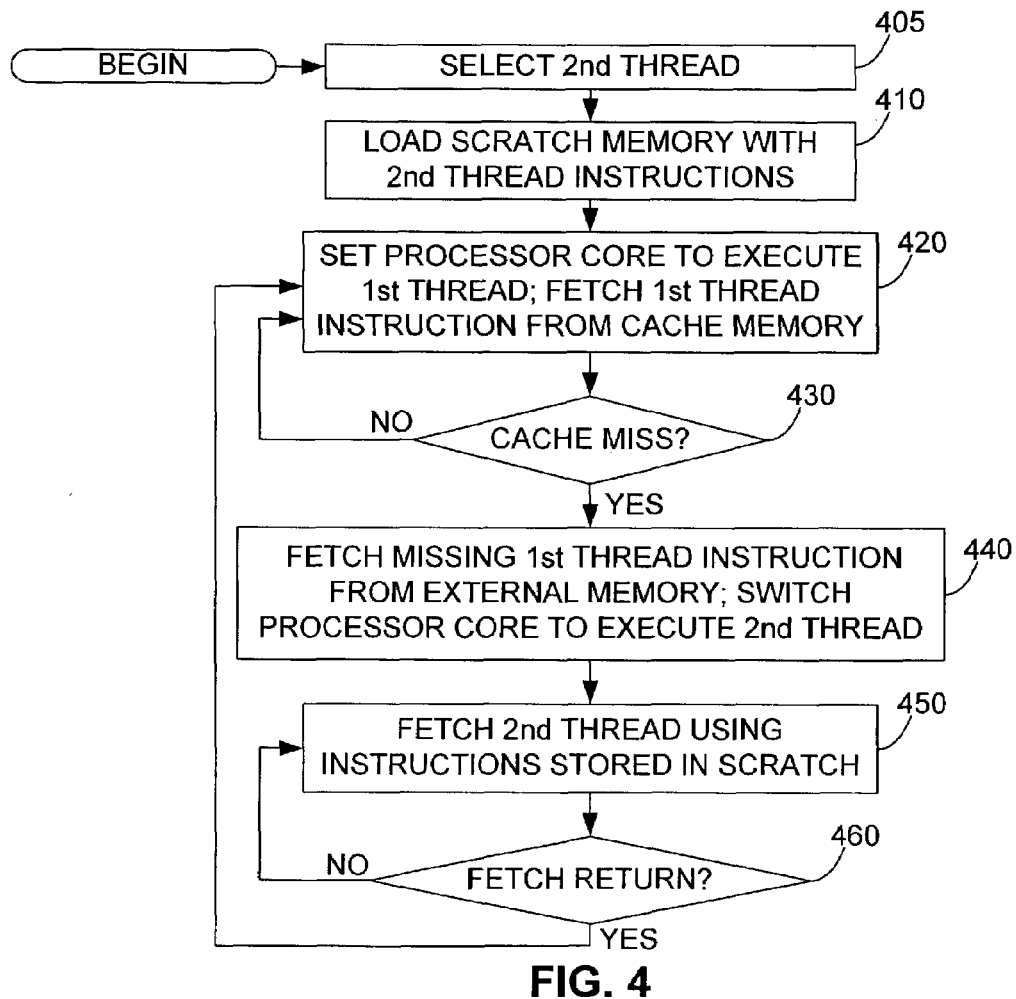
FIG. 4 is a flow diagram showing a method for operating the embedded processor system of FIG. 3 according to another embodiment of the present invention

FIG. 4 is a flow diagram showing a method for operating embedded processor system 300 (FIG. 3) according to another embodiment of the present invention.

Before system operation, the pre-selected (second) thread is selected from the two or more threads produced, for example, when the program to be executed by system 300 has been compiled using known techniques (block 405). The identification/selection of the pre-selected thread stored in scratch memory 340 is important in that timing critical threads, or threads that contains repetitive short code loops typically produce the best performance gains. It is worth noting that applications executing two or more independent tasks (i.e., threads) and have relatively long load latencies are best suited to the present invention (e.g., portable wireless devices such as cell phones, PDAs, GPS devices, engine controllers, as well as telephony and Voice-over-IP terminals, disk drives, and optical (e.g., CD ROM and DVD) drivers). Conversely, if an application is inherently single-threaded, the present invention is likely to provide little or no benefit. Note also that the general and pre-selected threads are preferably completely data independent (i.e., not data interdependent) or semaphore managed to prevent blocking events during the execution of the pre-selected thread. Further, although the present example refers to only one general and one pre-selected thread, those skilled in the processor art will recognize that the present invention can be extended to two or more general threads and/or two or more pre-selected threads.

After the pre-selected thread is identified, all instructions associated with the pre-selected thread are written into scratch memory 340 (block 410). As set forth above, this memory writing process may take place during an initial configuration stage of system operation, and may involve writing instructions stored on external memory device 120 into scratch memory 340. However, unlike instructions subsequently written into cache memory 330, the instructions written into scratch memory 340 will not be overwritten during normal system operation.

After the pre-selected thread instructions are stored in scratch memory 340, system operation is initiated, and processor core 310 is set to execute the general (first) thread (block 420). In one embodiment, setting processor core 310 to execute the general thread involves, for example, controlling multiplexer 312 to pass instructions from cache memory 330 to processor core 310, and activating the stored thread context or virtual processor instantiation state associated with the general thread. As described above, the processor execution also involves controlling program counter 320 to generate instruction address values, which are associated with sequential instructions of the general thread that are to be executed by processor 310. Each generated instruction address value is transmitted to cache memory 330. If a next instruction is present (i.e., previously stored) in cache memory 330 (i.e., NO in decision block 430), then the instruction is passed to processor core 310 in a relatively short amount of time, and execution of the general thread proceeds with the fetching of a next sequential instruction (block 420). Conversely, if the instruction was not stored in cache memory 330 (YES in decision block 430), then a relatively long external memory fetch is initiated, and processor core 310 is switched to execute the pre-selected thread (block 440). Similar to execution of the general thread, switching processor core 310 to execute the pre-selected thread involves activating the stored virtual processor instantiation associated with the pre-selected thread, and controlling multiplexer 312 to pass instructions from scratch memory 340. Next, utilizing instruction address values generated by program counter 325, instructions associated with the pre-selected thread are sequentially fetched from scratch memory 340 and loaded into processor core 310 (block 450). The pre-selected thread is thus executed until the cache miss associated with the general thread is completed (YES in block 460), at which time processor core 310 is switched back to execute the general thread (block 420).

Figure 5:
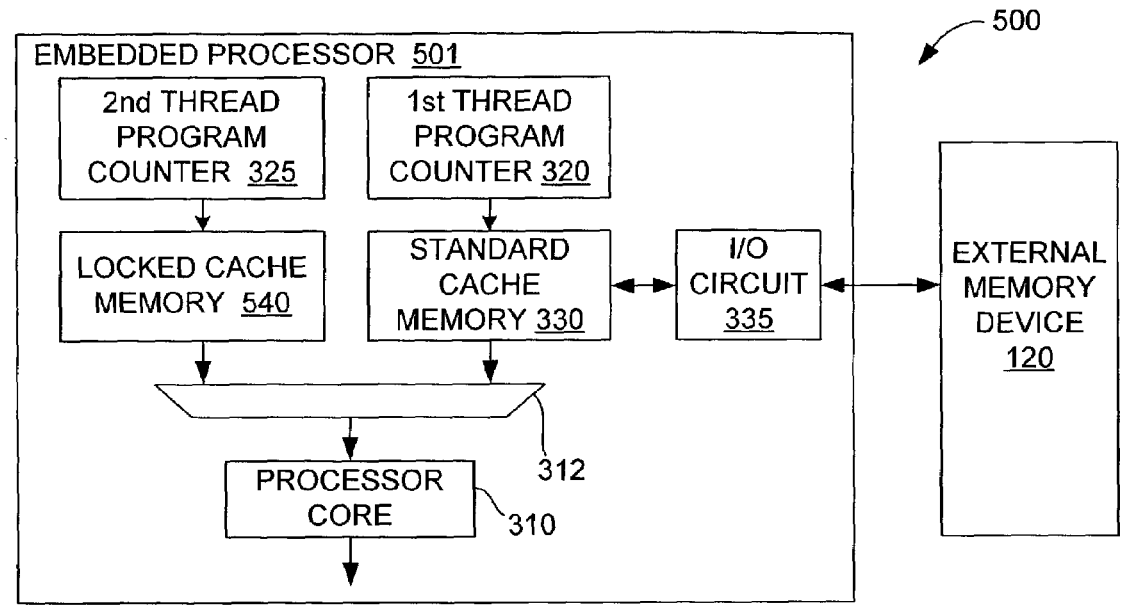
FIG. 5 is a simplified block diagram showing an embedded processor system according to another specific embodiment of the present invention.

FIG. 5 is a block diagram showing a portion of a system 500 including a multi-threaded embedded processor 501 according to another specific embodiment of the present invention. System 500 is similar to system 300 (described above) with the specific exception that, instead of a scratch memory, embedded processor 501 includes a locked cache memory 540 for storing instructions associated with the pre-selected thread. System 500 otherwise includes essentially identical elements to those used in system 300 (as indicated by similar reference numbers), and operates essentially in the manner described above with respect to system 300.

Figure 6:
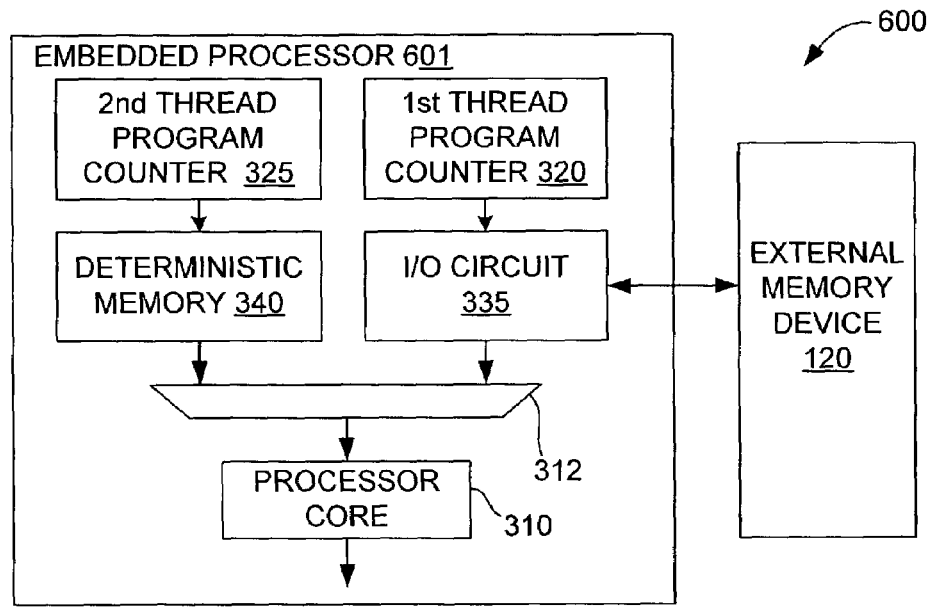
FIG. 6 is a simplified block diagram showing an embedded processor system according to yet another specific embodiment of the present invention.

FIG. 6 is a block diagram showing a portion of a system 600 including a multi-threaded embedded processor 601 according to yet another specific embodiment of the present invention. System 600 is similar to system 300 (described above) with the specific exception that embedded processor 601 omits a cache memory for storing instructions associated with the general thread (i.e., each fetch associated with the general thread involves reading an instruction from external memory device 120). System 600 otherwise includes essentially identical elements to those used in system 300 (as indicated by similar reference numbers), and operates essentially in the manner described above with respect to system 300.

In the various embodiments of this invention, novel structures and methods have been described to improve the performance of an embedded processor system while minimizing cost and power consumption increases. The embodiments of the structures and methods of this invention that are described above are illustrative only of the principles of this invention and are not intended to limit the scope of the invention to the particular embodiments described. Thus, the invention is limited only by the following claims.

The invention claimed is:

1. A multi-threaded embedded processor for a system including an external memory device, wherein the embedded processor comprises:
   a processor core including means for simultaneously storing a first execution state of a first thread and a second execution state of a second thread;
   a cache memory for temporarily storing first instructions associated with the first thread that are read from the external memory device; and
   a deterministic memory for continuously storing second instructions associated with the second thread.

2. The multi-threaded embedded processor according to claim 1, further comprising means for loading the first instructions during execution of the first thread by the processor core, and for loading the second instructions during execution of the second thread by the processor core.

3. The multi-threaded embedded processor according to claim 2, wherein said means comprises one or more multiplexers.

4. The multi-threaded embedded processor according to claim 1, further comprising a first program counter coupled to the cache memory, and a second program counter coupled to the deterministic memory.

5. The multi-threaded embedded processor according to claim 1, further comprising an input/output circuit coupled to the cache memory for reading instructions from the external memory device.

6. The multi-threaded embedded processor according to claim 1, wherein the deterministic memory comprises one of a scratch memory and a locked cache memory.

7. A multi-threaded embedded processor for a system including an external memory device, wherein the embedded processor comprises:
  fetching means for fetching first instructions associated with a first thread from the external memory device;
  a deterministic memory for storing second instructions associated with a second thread;
  a processor core including means for simultaneously storing a first execution state of the first thread and a second execution state of the second thread; and
  switching means for loading the first instructions into the processor core during execution of the first thread, and for loading the second instructions into the processor core during execution of the second thread.

8. The multi-threaded embedded processor according to claim 7, wherein the fetching means comprises:
  a first program counter for storing a first instruction address value associated with a corresponding first instruction of the first thread; and
  an input/output (I/O) circuit for transmitting the first instruction address value to the external memory device, and for passing the corresponding first instruction read from the external memory device to the switching means.

9. The multi-threaded embedded processor according to claim 8, wherein the fetching means further comprises a cache memory for temporarily storing the corresponding first instruction read from the external memory device.

10. The multi-threaded embedded processor according to claim 7, wherein the deterministic memory comprises one of a scratch memory and a locked cache memory.

11. The multi-threaded embedded processor according to claim 7, wherein the switching means comprises one or more multiplexers.

12. A multi-threaded embedded processor for a system including an external memory device, wherein the embedded processor comprises:
  a processor core including means for selectively loading and executing instructions associated with a first thread and a second thread;
  a first program counter for generating first instruction address values associated with corresponding first instructions of the first thread,
  a second program counter for generating second instruction address values associated with corresponding second instructions of the second thread;
  a deterministic memory coupled to the second program counter for storing the second instructions of the second thread; and
  switching means for loading the first instructions into the processor core during execution of the first thread, and for loading the second instructions from the deterministic memory into the processor core during execution of the second thread.

13. The multi-threaded embedded processor according to claim 12, further comprising a cache memory coupled between the first program counter and the switching means.

14. The multi-threaded embedded processor according to claim 12, further comprising an input/output (I/O) circuit coupled to the cache memory for reading instructions from the external memory device.

15. The multi-threaded embedded processor according to claim 12, wherein the deterministic memory comprises one of a scratch memory and a locked cache memory.

16. An electronic system including:
an external memory device; and
a multi-threaded embedded processor connected to the external memory device, wherein the embedded processor comprises:
  a processor core including means for simultaneously storing a first execution state of a first thread and a second execution state of a second thread;
  fetching means for fetching first instructions associated with the first thread from the external memory device;
  a deterministic memory for continuously storing second instructions associated with the second thread; and
  switching means for loading the fetched first instructions into the processor core during execution of the first thread, and for loading the second instructions into the processor core during execution of the second thread.

17. The electronic system according to claim 16, wherein said switching means comprises a multiplexer including a first set of input terminals for receiving said instructions associated with the first thread, a second set of input terminals connected to the deterministic memory, and a set of output terminal connected to the processor core.

18. The electronic system according to claim 16, wherein said fetching means comprises a first program counter coupled to a cache memory, and an input/output circuit coupled between the cache memory and the external memory device.

19. The electronic system according to claim 16, further comprising a second program counter coupled to the deterministic memory.

20. The electronic system according to claim 16, wherein the deterministic memory comprises one of a scratch memory and a locked cache memory.

21. An electronic system including:
an external memory device; and
a multi-threaded embedded processor connected to the external memory device, wherein the embedded processor comprises:
  a processor core including means for selectively loading and executing instructions associated with a first thread and a second thread;
  a first program counter for generating first instruction address values associated with corresponding first instructions of the first thread,
  a second program counter for generating second instruction address values associated with corresponding second instructions of the second thread;
  a deterministic memory coupled to the second program counter for storing the second instructions of the second thread; and
  switching means for loading the first instructions into the processor core during execution of the first thread, and for loading the second instructions from the deterministic memory into the processor core during execution of the second thread.

22. The electronic system according to claim 21, further comprising a cache memory coupled between the first program counter and the switching means.

23. The electronic system according to claim 21, further comprising an input/output (I/O) circuit coupled to the cache memory for reading instructions from the external memory device.

24. The electronic system according to claim 21, wherein the deterministic memory comprises one of a scratch memory and a locked cache memory.

25. A method for operating a system including a multi-threaded embedded processor and an external memory device, wherein the multi-threaded embedded processor includes a processor core having means for simultaneously storing a first execution state of a first thread and a second execution state of a second thread, wherein the method comprises:
   storing all instructions associated with the second thread in a memory circuit provided on the multi-threaded embedded processor;
   executing the first thread in the processor core by activating said first execution state, reading at least one instruction associated with the first thread from the external memory, and loading said at least one instruction into the processor core; and
   upon detecting a blocking event associated with the execution of the first thread, executing the second thread in the processor core by activating said second execution state, and loading at least one of said stored instructions associated with the second thread.

26. The method according to claim 25, wherein storing said all instructions associated with the second thread comprises storing said instructions in a scratch memory.

27. The method according to claim 25, wherein storing said all instructions associated with the second thread comprises storing said instructions in a locked cache memory.

28. The method according to claim 25, wherein executing the first thread further comprises temporarily storing said at least one instruction read from the external memory in a cache memory.

29. The method according to claim 25, further comprising, upon completion of the detected blocking event, executing the first thread in the processor core by reactivating said first execution state.

* * * * *

UNITED STATES PATENT AND TRADEMARK OFFICE
CERTIFICATE OF CORRECTION

| | | |
|---|---|---|
| PATENT NO. | : 7,062,606 B2 | Page 1 of 1 |
| APPLICATION NO. | : 10/431996 | |
| DATED | : June 13, 2006 | |
| INVENTOR(S) | : Robert E. Ober et al. | |

It is certified that error appears in the above-identified patent and that said Letters Patent is hereby corrected as shown below:

On Title Page Item (57)
In the Abstract:

Line 8, "operation" should read --operations--

In the Specification:

At Column 1, line 48, "101A" should read --100A--

At Column 4, line 16, "execution the" should read --execution of the--

At Column 7, line 59, "terminal" should read --terminals--

Signed and Sealed this

Twenty-sixth Day of December, 2006

JON W. DUDAS
*Director of the United States Patent and Trademark Office*